United States Patent [19]

Kho

[11] Patent Number: 5,286,047
[45] Date of Patent: Feb. 15, 1994

[54] RETAINER FOR A SUITCASE WHEEL ASSEMBLY

[76] Inventor: Dick T. Kho, P.O. Box 34454, West Los Angeles, Calif. 90034

[21] Appl. No.: 795,660

[22] Filed: Nov. 21, 1991

[51] Int. Cl.$^5$ ............................................. B62B 1/12
[52] U.S. Cl. ........................... 280/47.131; 190/18 A; 280/37; 280/47.24
[58] Field of Search ............... 280/47.131, 37, 47.17, 280/47.24, 47.26, 7.12, 8, 767; 190/18 A; 292/300; 403/353; 446/469; 16/262

[56] References Cited

U.S. PATENT DOCUMENTS

| | | | |
|---|---|---|---|
| 2,510,310 | 6/1950 | Francis | 446/469 |
| 3,788,689 | 1/1974 | Lloyd | 292/304 |
| 3,805,325 | 4/1974 | Lee | 16/262 |
| 3,997,038 | 12/1976 | Walker | 190/18 A |
| 4,900,043 | 2/1990 | Kho | 280/37 |

FOREIGN PATENT DOCUMENTS

| | | | |
|---|---|---|---|
| 3302672 | 8/1984 | Fed. Rep. of Germany | 190/18 A |
| 580934 | 10/1976 | Switzerland | 190/18 A |

*Primary Examiner*—Eric D. Culbreth

[57] ABSTRACT

A transport device is provided that includes a wheel assembly having a round axle that supports a pair of wheels and a handle and that has at least two separated flattened portions. The flattened portions each have a diametrical dimension smaller than the axle diameter in one direction only. At least two first wall members extend away from a surface and are positioned to accept the flattened portions of the axle. Each wall member terminates in a first edge and defines a first slot therein. One end of each slot has an opening just large enough to pass one of the flattened portions of the axle but not large enough to pass the full diameter of the axle. The slots of each wall member are aligned for jointly holding the axle. At least one second wall member is included that extends away from the surface and terminates in a second edge. The second wall member defines a second slot therein for accepting and retaining a portion of the handle when the handle is positioned parallel to the surface. When the handle is in such a position, the flattened portions of the axle are out of alignment with the first slot such that the axle cannot be withdrawn from the first slot. The second slot has a device for clamping such that the handle, when inserted into the second slot, is positively captured. A base is further included with the transport device, the base having the surface for mounting of the first and second walls and being one side of a suitcase structure.

6 Claims, 3 Drawing Sheets

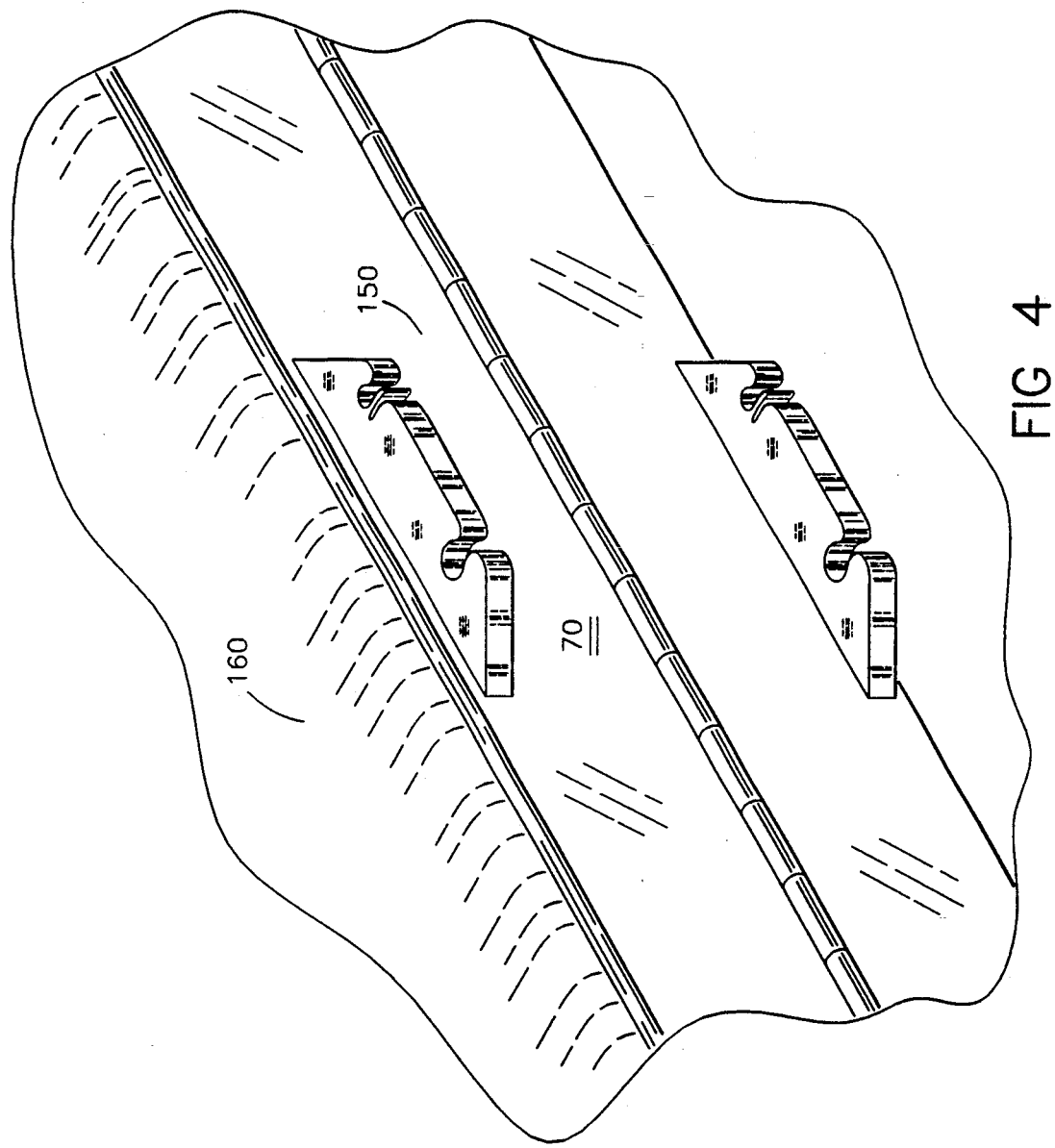

RETAINER FOR A SUITCASE WHEEL ASSEMBLY

FIELD OF THE INVENTION

This invention relates generally to suitcases with wheel assemblies, and, more particularly, to a suitcase with an integral wheel bracket for releasably holding a wheel assembly.

BACKGROUND AND BRIEF SUMMARY OF THE INVENTION

This application is an improvement over my previous U.S. Pat. No. 4,900,043 and my previous U.S. patent application Ser. Nos. 07/512,426, now abandoned and 07/660,067, still pending. The present invention is a transport device that includes an integral wheel assembly having a round axle with a diameter. The axle supports a pair of wheels and a handle, and has at least two separated flattened portions. The flattened portions each have a diametrical dimension smaller than the axle diameter in one direction only and are identically aligned. At least two first wall members extend away from a surface and are positioned to accept the flattened portions of the axle. Each wall member terminates in a first edge, and each wall member defines a first slot therein. One end of each slot has an opening interconnected with the first edge, the opening just large enough to pass one of the flattened portions of the axle but not large enough to pass the full diameter of the axle. The slots of each wall member are aligned for jointly holding the axle.

The transport device further includes a second wall member extending away from the surface and terminating in a second edge. The second wall member defines a second slot therein for accepting and retaining a portion of the handle when the handle is positioned parallel to the surface. When the handle is in such a position, the flattened portions of the axle are out of alignment with the first slot such that the axle cannot be withdrawn from the first slot. The second slot has a means for clamping such that the handle, when inserted into the second slot, is positively captured. Preferably, a base is further included with the transport device, the base having the surface for mounting of the first and second walls. Preferably the first and second walls are contiguous and integral with a suitcase structure.

In operation, the axle is inserted into the first slots by aligning the flattened portions thereof with the opening of each of the first slots. The axle is then rotated so that the flattened portions are not aligned with the opening of each of the first slots, the handle being pressed into the second slot for capture therein. The transport device is then guided along the ground until a destination has been reached. If necessary, the wheel assembly can be removed from the first wall members by grasping the handle, pulling it free of the second slot, and pivoting the axle until the flattened portions are aligned with the first slot of each first wall member. The wheel assembly may then be removed from the first wall members.

A suitcase structure with such a transport device has improved mobility while being relatively inexpensive to manufacture and assemble. Moreover, as the wheels may be of any convenient size and still not contact the suitcase structure, the transport device is more effective over rough terrain such as cobblestone driveways, gravel, and the like. Further, the transport device is easily detached and stowed or carried when necessary. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is a perspective illustration of the wall members of the invention integral with a suitcase structure.

DETAILED DESCRIPTION OF THE PREFERRED EMBODIMENT

Figure 1:
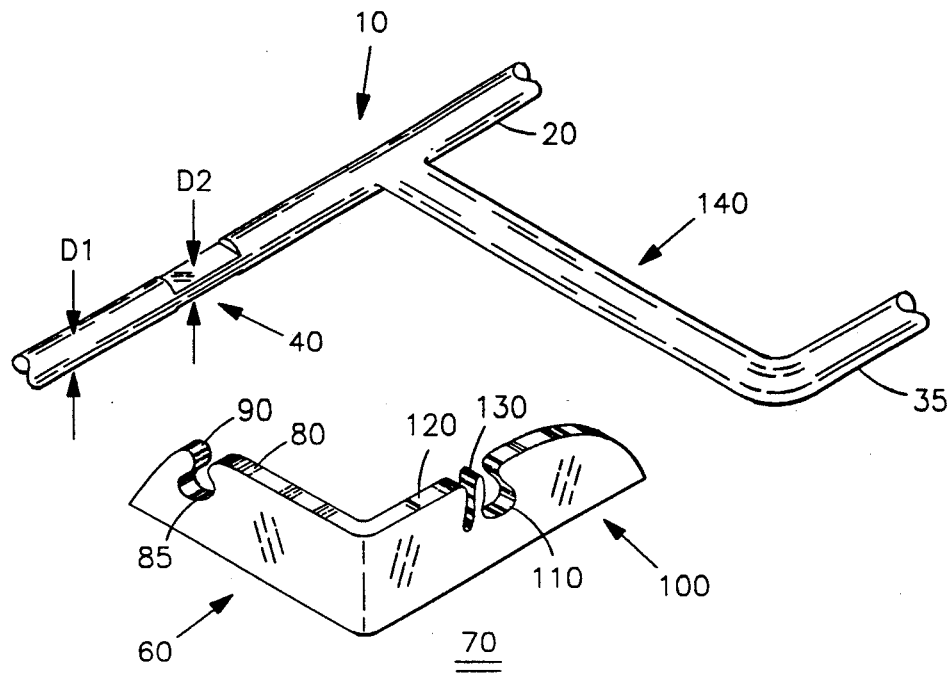
FIG. 1 is an exploded fragmentary view of an axle and wall members of the invention.
Figure 2:
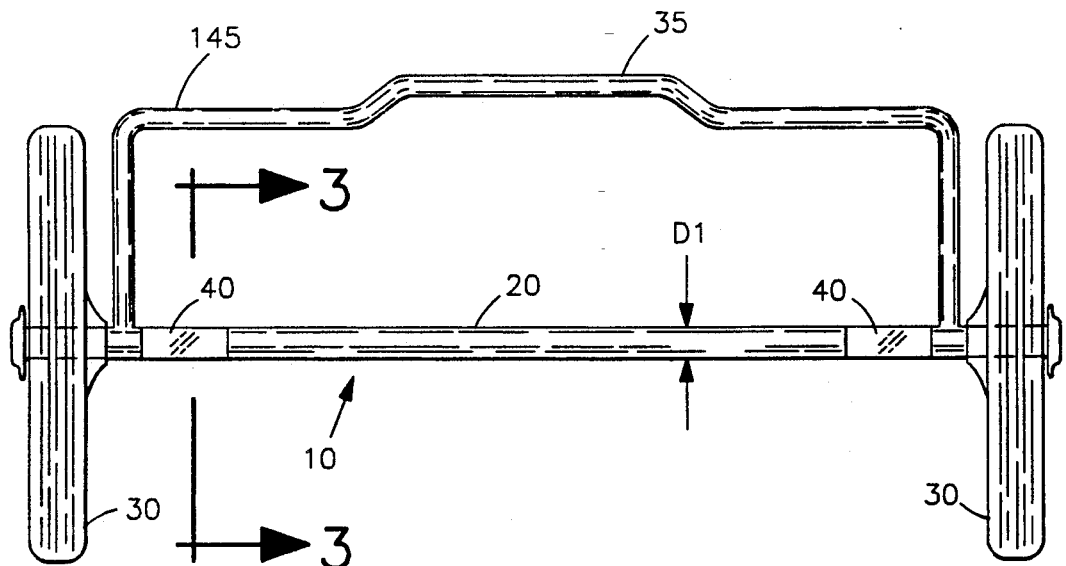
FIG. 2 is a top plan view of a wheel assembly of the invention, illustrating a handle and a pair of wheels.
Figure 3:
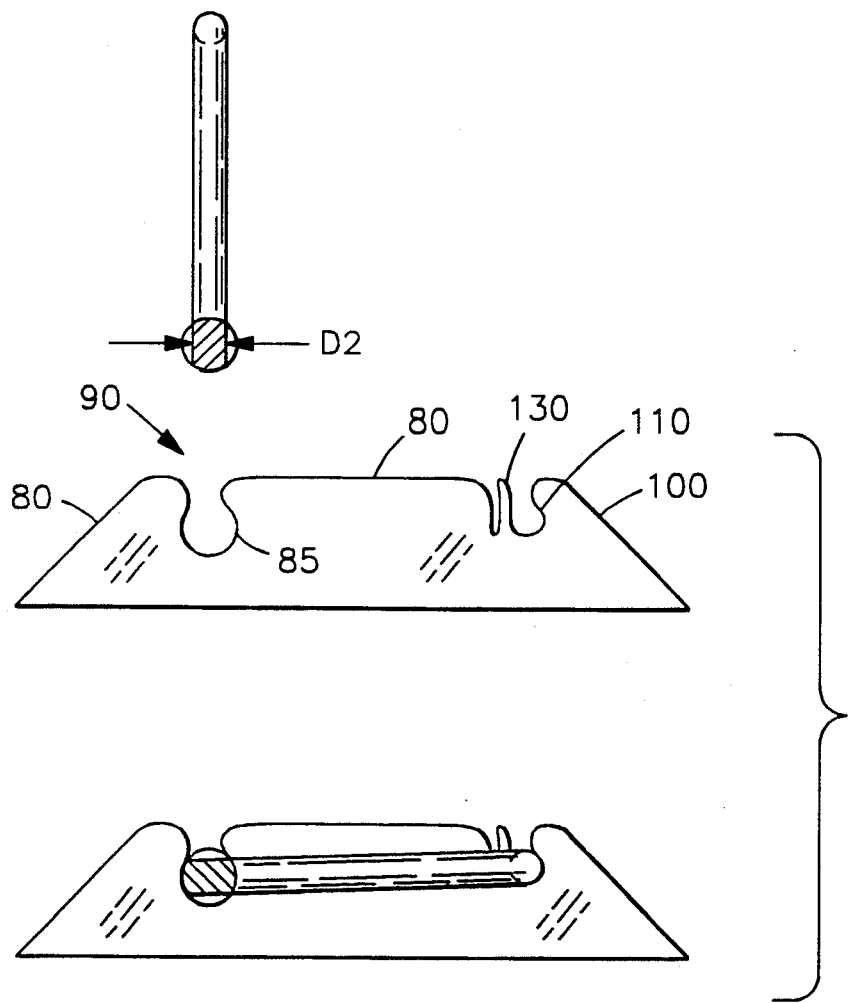
FIG. 3 is an exploded cross sectional view of the invention, illustrating the axle and a first wall member of the invention.

FIG. 1 shows a transport device that includes an integral wheel assembly 10 having a round axle 20 with a diameter D1. The axle 20 supports a pair of wheels 30 and a handle 35 (FIG. 2), and has at least two spaced apart flattened portions 40 aligned in planes parallel to the plane of the handle 35. The distance across the flattened portions D2 is smaller than the axle diameter D1. A pair of wall means 60 each having a first slot 85, extend away from a surface 70 and are positioned on surface 70 so that each slot 85 may accept one of the flattened portions 40 of the axle 20. Each wall means 60 terminates in a top edge 80. One end of each slot 85 has an opening 90 interconnected with the first edge 80, the opening 90 being just large enough to pass one of the flattened portions 40 but not large enough to pass the full diameter D1 of the axle 20 (FIG. 3). The slots 85 of each wall means 60 are aligned for jointly holding the axle 20.

Each of the wall means 60 may further include a second wall member 100 (FIG. 1) extending away from the surface 70 and terminating in a second edge 120. The second wall member defines a second slot 110 therein for accepting and retaining a portion of the handle 35 when the handle 35 is positioned parallel to the surface 70. When the handle 35 is in such a position, the flattened portions 40 of the axle 20 are out of alignment with the first slot 85 such that the axle 20 cannot be withdrawn from the first slots 85. The second slot 110 has a clamping means 130 perferably formed integrally with the wall means 60 and which forms a movable finger capable of being forced to one side to allow the passage of handle 35 into second slot 110 and to move back to a nominal position after the handle 35 has passed into second slot 110 such that the handle 35, when inserted into the second slot 110, is positively captured. Preferably, a base 150 is further included with the transport device, the base 150 having the surface 70 for mounting of the wall means 60. Preferably the wall means 60 are integral with a suitcase structure 160.

In one embodiment of the invention, the handle 35 includes at least one portion 140 orthogonal to the axle 20, and the second slot 110 is transverse to the first slot 85 such that the orthogonal portion 140 of the handle 35 is aligned with the second slot 110 for affecting capture of the handle 35 (FIG. 1). In an alternate embodiment of the invention, the handle 35 includes at least one portion 145 parallel to the axle 20, the second slot 110 being positioned such that the parallel portion 145 of the handle 35 is aligned with the second slot 110 for capture of the handle 35 (FIGS. 2, 3, and 4). Preferably, the wheel assembly 10 is manufactured from a strong metal or plastic. Likewise, each wall means 60 is manufactured from a strong metal or plastic material, providing that the clamping means 130 is flexible enough to accept the handle 35 therein, yet is also strong enough to retain said handle 35 while the transport device is in motion and being directed over an uneven surface, such as a cobblestone driveway or a rough sidewalk.

In operation, the axle 20 is inserted into the first slots 85 by aligning the flattened portions 40 of the axle 20 with the opening 90 of each of the first slots 85. The axle 20 is then rotated so that the flattened portions 40 are not aligned with the opening 90 of each of the first slots 85, the handle 35 being pressed into the second slot 110 for capture therein. The transport device is then guided along the ground (not shown) until a destination has been reached. If necessary, the wheel assembly 10 can be removed from the wall means 60 by grasping the handle 35 and pulling it free of the second slot 110, pivoting the axle 20 until the flattened portions 40 are aligned with the first slot 85 of each wall means 60. The wheel assembly 10 may then be removed from the first slots 85 and stored or carried separately, as necessary.

I claim:

1. A transport device, comprising:
   a wheel assembly having a round axle with a diameter, the axle supporting a pair of wheels and a handle, and having at least two spaced apart flattened portions, the axle, across the flattened portions, having a smaller dimension than the axle diameter;
   a pair of wall means extending away from a surface, each said wall means having a first slot, positioned to accept one of the flattened portions of the axle, for rotational motion of the axle within the first slots, each of the slots having an opening interconnecting the top edge of the wall means with the first slot the opening being more narrow than the first slot such that the flattened portion of the axle will pass through the opening to engage the axle within the slot and after a 90 degree rotation of the axle within the slot the axle will not pass through the opening so that the axle is captured within the slots;
   at least one of the wall means defining a second slot therein for accepting a portion of the handle when the handle is positioned parallel to the surface, the flattened portions of the axle being out of alignment with the first slot portion such that the axle cannot be withdrawn from the first slots, the second slot having a means for clamping such that the handle is removably, yet positivity captured therein;
   whereby the transport device is held onto the surface for improved mobility of an object providing said surface.

2. The device of claim 1 wherein the handle includes at least one portion orthogonal to the axle, the second slot being transverse to the first slot and aligned such that the orthogonal portion of the handle is aligned for insertion therein.

3. The device of claim 2 further including a base, the base providing said surface.

4. The device of claim 1 wherein the handle includes at least one portion parallel to the axle, the second slot being positioned such that the parallel portion of the handle is aligned with the second slot for capture of the handle therein.

5. The device of claim 1 wherein the wall means supports the first and the second slots in orthogonal juxtaposition.

6. The device of claim 1 wherein the wall means are integral with a suitcase structure.

* * * * *